Dec. 15, 1942.  H. KUPPENBENDER ET AL  2,305,293
PHOTOGRAPHIC CAMERA
Filed April 18, 1940
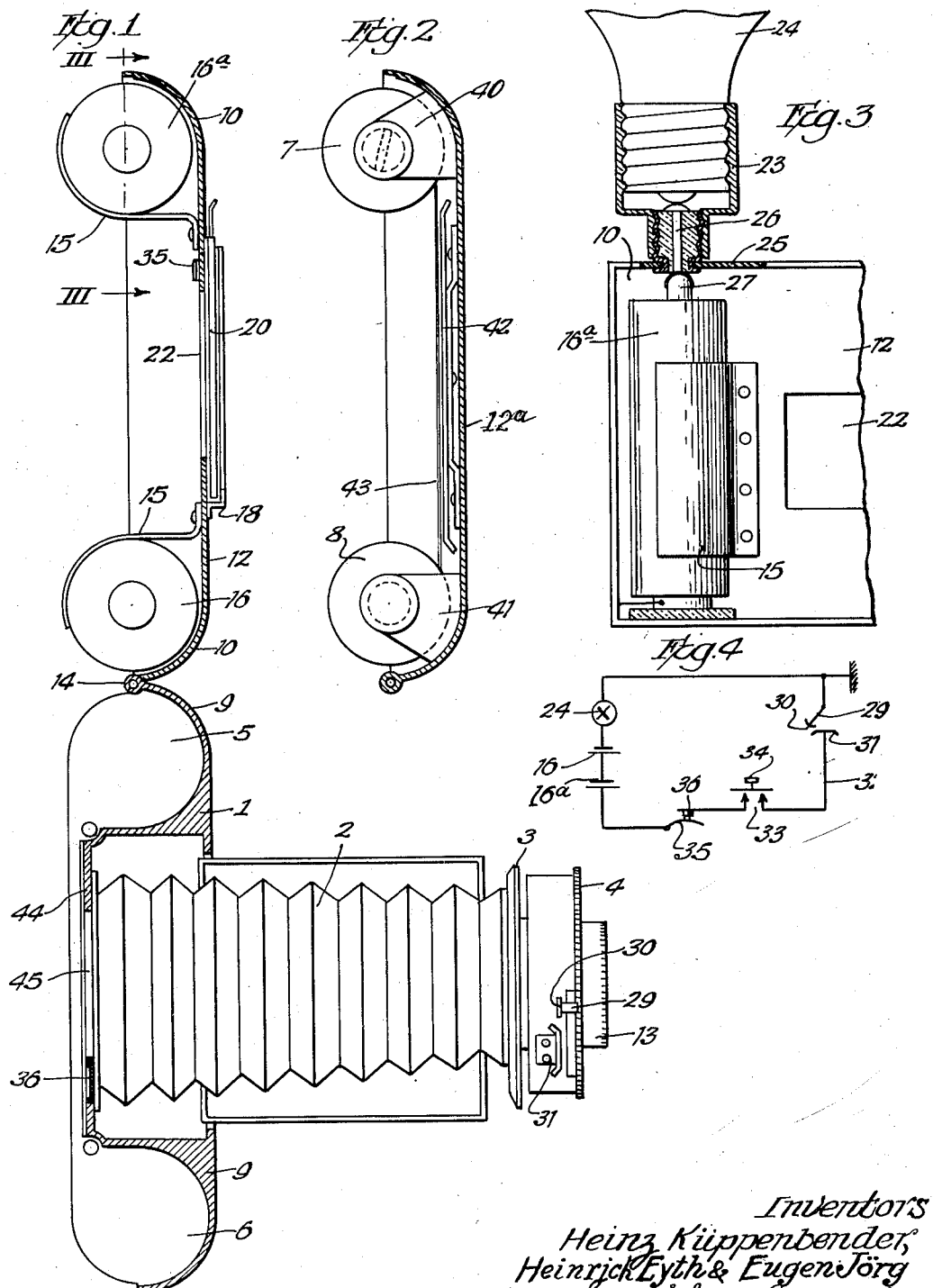
Inventors
Heinz Kuppenbender,
Heinrich Eyth & Eugen Jörg
by Singer, Ehlat, Stern & Carlberg
Attys.

Patented Dec. 15, 1942

2,305,293

UNITED STATES PATENT OFFICE 2,305,293

PHOTOGRAPHIC CAMERA

Heinz Kuppenbender, Dresden, and Heinrich Eyth and Eugen Jörg, Stuttgart, Germany; vested in the Alien Property Custodian Application April 18, 1940, Serial No. 330,296
In Germany February 8, 1939

6 Claims. (Cl. 67—29)

The invention relates to improvements in photographic cameras, and particularly is directed to rollfilm cameras, provided with a flash synchronizer. In cameras of this type it is possible to adjust the shutter for snapshot speeds and obtain by means of a synchronizer switch, which is closed by the shutter, a firing of a flash bulb during the short time interval the shutter is open.

The principal object of the present invention is to provide a rollfilm camera with a removable rear wall which may be readily substituted by another rear wall provided with a cut film holder or a plate holder and dry cell batteries, which latter in the attached position of the camera rear wall occupy the space normally occupied by the rollfilm spools. The dry cell batteries may be used for operating any desired auxiliary device, as for instance an exposure meter employing a photoelectric cell, a flash synchronizer or the like. It thus is possible to use the rollfilm camera for taking flash light pictures, which due to the use of a film pack or plate may be individually developed. This is an advantage especially appreciated by news reporters whose pictures sometimes are only of value or of most value when published immediately after they have been taken.

Another object of the invention is to provide a rollfilm camera with two selectively employable removable rear walls, one of which carries two film spools for a roll film, while the other rear wall carries in place of the film spools two dry cell batteries or similar sources of current and in addition thereto is adapted to receive a film pack, or cut film holder or a plate holder. Therefore, it is possible to use the camera selectively as a rollfilm camera and as film pack, cut film or plate camera. When cut films or plates are used the batteries for firing the flash bulb are conveniently mounted in the conventional film spool chambers of the camera, and it is only necessary to insert a flash bulb in the socket provided on the camera.

Other objects of the invention will be apparent from the following description, forming a part of this specification, but the invention is not limited to the embodiment herein described, as various other embodiments may be adopted within the scope of the claims.

The drawing illustrates by way of example one embodiment of the invention.

Fig. 1 illustrates in top plan view and partly in horizontal section a photographic camera with a removable substitute rear wall shown in open position and carrying two dry cell batteries and a cut film holder.

Fig. 2 illustrates the detachable rear wall of the roll film camera, which rear wall carries two film spools for a rollfilm and a film pressure plate.

Fig. 3 illustrates a vertical section along the line III—III of Fig. 1 to show the arrangement of the socket for the flash bulb, and Fig. 4 is a wiring diagram of the flash synchronizer.

Referring to Fig. 1, the photographic camera illustrated has a camera casing 1 provided with an extensible bellows 2, on the front end of which is attached by means of a suitable support 3 the shutter 4 and the objective 13 in form of an assembled unit. At both ends of the camera casing 1 are provided the customary chambers 5 and 6 respectively, which when the camera is loaded with rollfilm receive the film supply spool 7 and film take up spool 8 respectively. In the present instance the chambers 5 and 6 are formed by complementary semi-circular wall portions 9 and 10 of the casing 1 and the detachable rear wall of the camera respectively. The rear wall 12 is detachably connected to the camera casing at 14 and is provided on its inner face with two resilient brackets 15 for holding two dry cell batteries 16 and 16a in place. When the rear wall 12 is closed the dry cell batteries 16, 16a are located in the customary film spool chambers 5 and 6 of the camera. The outer face of the rear wall 12 is provided with a suitable frame 18 or the like for removably receiving a cut film holder or a plate holder 20. The cut film or the plate is exposed through an aperture 22 in the rear wall 12.

A socket 23 for a flash bulb 24 is mounted on the top wall of the camera, preferably in axial alinement with one of the dry cell batteries 16 or 16a. According to Fig. 3 the rear wall 12 of the camera has an upper rectangular wall portion 25 arranged substantially in the plane of the top wall of the camera casing 1 and on this wall portion 25 is mounted the socket 23 in an electrically conductive manner with the metallic mass of the rear wall and the camera casing 1. The socket 23 has an electrically insulated center contact 26 which is in conductive engagement with the upper terminal 27 of the battery 16a which is arranged in axial alinement with the socket 23.

In other respects the arrangement and operation of the synchronizing circuit is similar to that described in applicants' copending patent application Serial No. 301,266, filed on October 25, 1939, and therefore the diagrammatic illustration of this circuit in this application is believed to be sufficient for a clear understanding of the same. In the same manner as in the said prior application, the shutter tensioning lever 29, which is grounded to the metallic mass of the camera, is provided with a contact 30 which, during the release of the shutter, engages automatically a contact member 31 mounted in an electrically insulated manner on the shutter casing. The contact member 31 is conductively connected by a flexible conductor 32 (Fig. 4) with a normally open switch 33 which is closed when the shutter release button 35 is manually depressed, whereupon the flash bulb 24 is fired when the shutter tensioning lever 29, 30 engages automatically the contact member 31 during its return movement.

In order to properly connect the other terminal 35 of the two serially connected dry cell batteries 16 and 16ª with the manually controlled switch 33 one contact of the latter is connected with an electrically insulated contact 36 on the camera casing 1, while the battery terminal 35 is preferably made resilient so as to properly engage the contact 36 when the rear wall 12 is attached to the camera casing 1 and is closed.

It is, of course, also possible to mount the socket 23 directly on an integral portion of the top wall of the camera casing 1, in which case it will be necessary to provide a resilient contact device between the center contact 26 of the socket 23 and the terminal 27 of the battery 16ª for properly establishing an electrical contact when the rear wall 12 is attached to the camera casing 1.

When the camera is to be used with a roll film, the rear wall 12 carrying the dry cell batteries 16 and the cut film holder 19 is substituted by a second rear wall 12ª on which the customary film supply spool 7 and film take-up spool 3 are mounted by means of bearing brackets 40 and 41 respectively. The rear wall 12ª is also provided with a yieldingly supported pressure plate 42 which urges the film 43 against the film supporting wall 44 in the camera casing 1, which wall 44 is provided with the customary picture window 45.

It is believed apparent from the above description of the invention that the camera can be selectively used as a cutfilm camera and a rollfilm camera by merely attaching thereto one of two available detachable rear walls, which are equipped with a cut film holder and rollfilm spools respectively.

What we claim as our invention is:

1. In a rollfilm camera, a camera casing provided with two chambers for a film supply spool and a film take-up spool, a shutter for controlling the light entering said camera, a normally open electric switch, means operated by said shutter for momentarily closing said switch during the time the shutter is open, a selectively employable substitute rear wall provided with means for holding a cut film holder or a plate holder and means for holding two dry cell batteries, said batteries when said substitute rear wall is attached to said camera casing being positioned in the said two chambers normally occupied by said film spools, and cooperating means on said camera casing and substitute rear wall respectively, for connecting said dry cell batteries in circuit with said shutter operated switch.

2. In a rollfilm camera, a camera casing provided with two chambers for a film supply spool and a film take-up spool, a shutter for controlling the light entering said camera, a normally open electric switch, means operated by said shutter for momentarily closing said switch during the time the shutter is open, a selectively employable substitute rear wall provided with means for holding a cut film holder or a plate holder and means for holding two dry cell batteries, said batteries when said substitute rear wall is attached to said camera casing being positioned in the said two chambers normally occupied by said film spools, a socket for a flash bulb, and means connecting said dry cell batteries in circuit with said shutter operated switch and said socket.

3. In a rollfilm camera, a camera casing provided with two chambers for a film supply spool and a film take-up spool respectively, a shutter for controlling the light entering said camera, and a normally open switch controlled by said shutter, and closed momentarily during the time the shutter is open, a socket for a flash bulb on said camera casing, a selectively employable substitute rear wall for said camera casing provided with means for holding a cut film holder or plate holder and means for holding two dry cell batteries, and conductor means automatically connecting said switch, socket and batteries in a circuit when said substitute rear wall is attached to said camera casing, said batteries in the attached position of said substitute rear wall being positioned in the chambers normally occupied by said film spools.

4. In a rollfilm camera, a camera casing having a top wall and provided with two chambers for a film supply spool and a film take-up spool respectively, a shutter for controlling the light entering said camera, and a normally open switch controlled by said shutter, and closed momentarily during the time the shutter is open, a selectively employable substitute rear wall provided with means for holding a cut film holder or plate holder and means for holding two dry cell batteries, said substitute rear wall being provided with a rectangular wall portion substantially in the plane of said top wall of the camera casing, a socket for a flash bulb on said rectangular wall portion, and conductor means automatically connecting said switch, socket and batteries in a circuit when said substitute rear wall is attached to said camera casing, said batteries in the attached position of said substitute rear wall being positioned in the chambers normally occupied by said film spools.

5. In a photographic camera, a casing, a detachable rear wall for said casing, provided with means for holding a cut film or plate holder and also with means for holding two dry cell batteries, said camera casing being provided at opposite ends each with a chamber into which the batteries extend when the rear wall is attached to the casing, a shutter for controlling the light entering the camera, a normally open switch controlled by said shutter and closed momentarily during the time the shutter is open, a socket for a flash bulb, and conductor means for automatically connecting said batteries, switch and socket in a circuit when the rear wall carrying the batteries is attached to the camera casing.

6. In a photographic camera, a camera casing provided at opposite ends each with a substantially semi-cylindrical chamber the axes of which are parallel to each other, a detachable rear wall having curved end portions which form complementary wall portions of said chambers when the rear wall is attached to said casing, means on said rear wall for holding the cut film or plate holder and means for holding two dry cell batteries, said batteries extending into the semi-cylindrical chambers of said casing when the rear wall is attached to the same.

HEINZ KUPPENBENDER.
HEINRICH EYTH.
EUGEN JÖRG.